(12) United States Patent
Takahashi

(10) Patent No.: US 11,593,041 B1
(45) Date of Patent: Feb. 28, 2023

(54) IMAGE FORMING SYSTEM

(71) Applicant: TOSHIBA TEC KABUSHIKI KAISHA, Tokyo (JP)

(72) Inventor: Koji Takahashi, Sumida Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/685,430

(22) Filed: Mar. 3, 2022

(51) Int. Cl.
*G06F 3/12* (2006.01)

(52) U.S. Cl.
CPC ............ *G06F 3/1208* (2013.01); *G06F 3/129* (2013.01); *G06F 3/1254* (2013.01); *G06F 3/1204* (2013.01)

(58) Field of Classification Search
CPC ...... G06F 3/1208; G06F 3/1254; G06F 3/129; G06F 3/1204
USPC ......................................................... 358/1.15
See application file for complete search history.

(56) References Cited

U.S. PATENT DOCUMENTS

2011/0208881 A1* 8/2011 Abe ...................... G06F 3/1226 710/15
2015/0160898 A1* 6/2015 Morita .................. G06F 3/1263 358/1.15
2018/0373472 A1* 12/2018 Itoh .......................... H04N 1/52
2019/0101857 A1 4/2019 Saito et al.
2020/0409614 A1* 12/2020 Hamada ................ G06F 3/1255

FOREIGN PATENT DOCUMENTS

JP 2005-156929 6/2005
JP 2020-126116 8/2020

* cited by examiner

*Primary Examiner* — Darryl V Dottin
(74) *Attorney, Agent, or Firm* — Amin, Turocy & Watson, LLP

(57) ABSTRACT

An image forming system includes a receiving unit that receives an adjustment value for adjusting a value of an applied voltage in case of transfer in response to an operation of a user, a detector that detects a value of an electric resistance of a print medium as a resistance value. A first control unit controls the applied voltage based on the adjustment value indicated by the second adjustment value information included in the adjustment update information received by the first communication unit. A second control unit uses the adjustment information transmitted respectively from the plurality of image forming devices and determines the adjustment values to be used in the plurality of image forming devices. A second communication unit transmits the adjustment update information including the second adjustment value information indicating the determined adjustment values respectively to the plurality of image forming devices.

20 Claims, 12 Drawing Sheets

FIG. 2 x1

| RESISTANCE VALUE (Ω) HUMIDITY (%) | 0~10 | 11~20 | 21~30 | 31~40 | 41~50 | 51~60 | 61~70 | ... |
|---|---|---|---|---|---|---|---|---|
| 7 | 870 | 665 | 525 | 420 | 385 | 350 | 231 | ... |
| 6 | 994 | 760 | 600 | 480 | 440 | 400 | 264 | ... |
| 5 | 1119 | 855 | 675 | 540 | 495 | 450 | 297 | ... |
| 4 | 1243 | 950 | 750 | 600 | 550 | 500 | 330 | ... |
| 3 | 1367 | 1045 | 825 | 660 | 605 | 550 | 363 | ... |
| 2 | 1492 | 1140 | 900 | 720 | 660 | 600 | 396 | ... |
| 1 | 1616 | 1235 | 975 | 780 | 715 | 650 | 429 | ... |

ADJUSTMENT VALUE

FIG. 3

| DEVICE IDENTIFICATION INFORMATION | INSTALLATION LOCATION INFORMATION | ADJUSTMENT INFORMATION ||||||
|---|---|---|---|---|---|---|---|
| | | PRINT MEDIUM INFORMATION || ENVIRONMENT VALUE INFORMATION || PRINT MODE INFORMATION | FIRST ADJUSTMENT VALUE INFORMATION ||
| | | PRINT MEDIUM TYPE INFORMATION | PRINT MEDIUM RESISTANCE VALUE INFORMATION (Ω) | TEMPERATURE INFORMATION (°C) | HUMIDITY INFORMATION (%) | | FIRST SURFACE ADJUSTMENT VALUE INFORMATION | FIRST BACK SURFACE ADJUSTMENT VALUE INFORMATION |
| AAA | 111 | PLAIN PAPER | x1 | 30 | 85 | COLOR PRINTING | -2 | +2 |
| BBB | 222 | PLAIN PAPER | x2 | 23 | 50 | COLOR PRINTING | +3 | -3 |
| CCC | 333 | HIGH-QUALITY PAPER | x3 | 10 | 20 | MONOCHROME PRINTING | 0 | 0 |
| ... | ... | ... | ... | ... | ... | ... | ... | ... |

FIG. 8

| FRONT SURFACE OF PLAIN PAPER | | RELATIVE HUMIDITY (%) | | | | | | |
|---|---|---|---|---|---|---|---|---|
| PAPER RESISTANCE | ADJUSTMENT VALUE | 10 | 20 | 30 | 40 | 50 | 65 | 85 |
| 0.4 | 4 | 870 | 665 | 525 | 420 | 385 | 350 | 231 |
| 0.6 | 6 | 994 | 760 | 600 | 480 | 440 | 400 | 264 |
| 0.8 | 8 | 1119 | 855 | 675 | 540 | 495 | 450 | 297 |
| 1.0 | 10 | 1243 | 950 | 750 | 600 | 550 | 500 | 330 |
| 1.2 | 12 | 1367 | 1045 | 825 | 660 | 605 | 550 | 363 |
| 1.4 | 14 | 1492 | 1140 | 900 | 720 | 660 | 600 | 396 |
| 1.6 | 16 | 1616 | 1235 | 975 | 780 | 715 | 650 | 429 |
| 1.8 | 18 | 1939 | 1482 | 1170 | 936 | 858 | 780 | 515 |
| 2.0 | 20 | 2327 | 1778 | 1404 | 1123 | 1030 | 936 | 618 |

IMAGE FORMING SYSTEM

FIELD

Embodiments described herein relate generally to an image forming system.

BACKGROUND

In the related art, in an image forming device, a toner image is transferred from a photoconductor to a transfer body such as an intermediate transfer belt and then transferred from the transfer body to a print medium. The image forming device applies a voltage between the transfer body and the print medium in case of transferring the toner image from the transfer body to the print medium. The toner image is transferred from the transfer body to the print medium by the application of the voltage. Here, the value of the electric resistance of the print medium to which the toner image is transferred changes in response to the change of an environment value such as a temperature and humidity in the image forming device. Therefore, the image forming device detects an environment value, refers to an expected control value obtained by a test or the like in advance if a voltage is applied to a print medium by a constant voltage method in case of transferring the toner image from the transfer body to the print medium, and determines a value of the voltage applied between the transfer body and the print medium in response to the detected environment value. However, in recent years, types of print media used in the image forming device increase, and thus the variation of the value of the electric resistance of the print medium increases. As a result, in the image forming device, the value of the electric resistance of the print medium and the expected control value may be inconsistent, and thus the quality of the image formed on the print medium may decrease.

DESCRIPTION OF THE DRAWINGS

FIG. 2 is a table showing an example of an applied voltage value table of a resistance value of x1 in a print medium;

FIG. 3 is a table showing examples of a plurality of kinds of adjustment information received by a server 2;

FIG. 8 is a diagram showing an example of an applied voltage adjustment value table;

DETAILED DESCRIPTION

Figure 1:
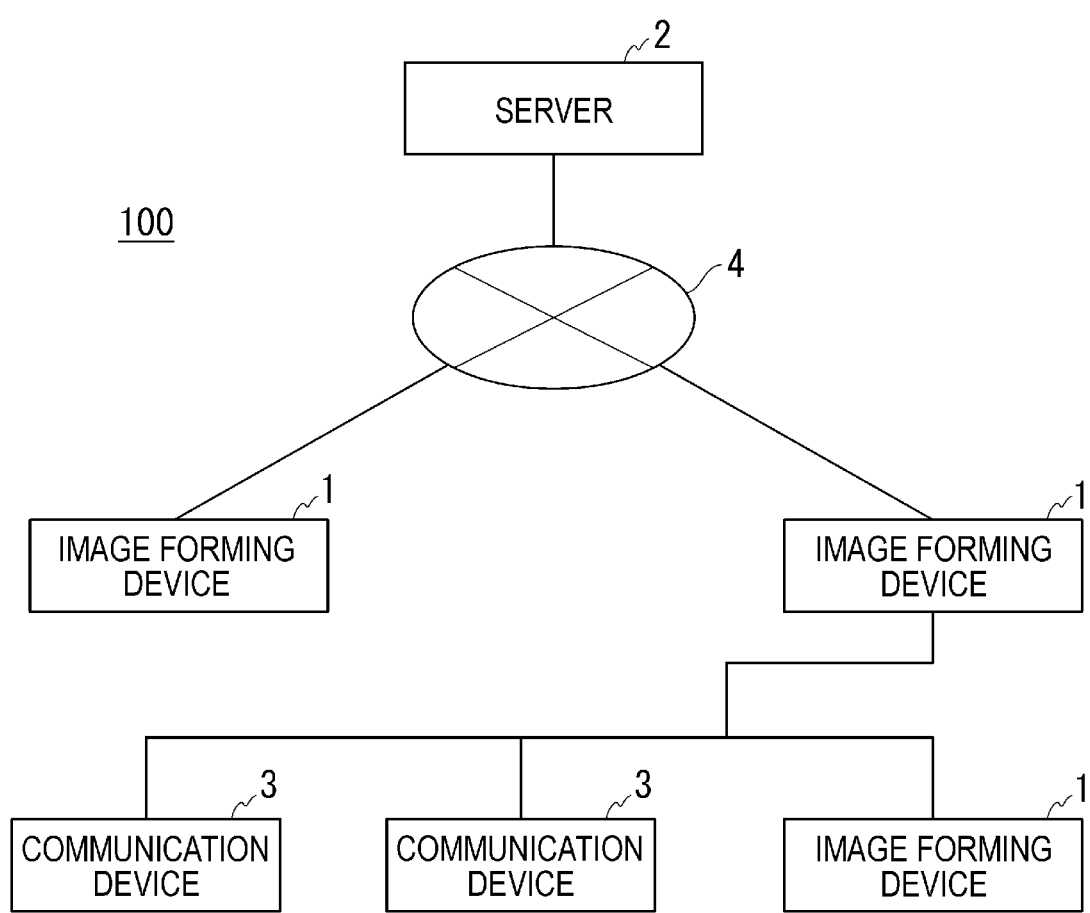
FIG. 1 is a diagram illustrating an example of a configuration of an image forming system 100.

In general, according to one embodiment, an image forming system includes a plurality of image forming devices and a server. The plurality of image forming devices each include a receiving unit, a detection unit, a first communication unit, and a first control unit. The receiving unit receives an adjustment value for adjusting a value of an applied voltage in case of transfer in response to an operation of a user. The detection unit detects a value of an electric resistance of a print medium as a resistance value. The first communication unit transmits adjustment information including first adjustment value information indicating the adjustment value received by the receiving unit and information indicating the resistance value detected by the detection unit to the server and receives adjustment update information including second adjustment value information indicating the adjustment value determined based on the adjustment information from the server. The first control unit controls the applied voltage based on the adjustment value indicated by the second adjustment value information included in the adjustment update information received by the first communication unit. The server includes a second control unit and a second communication unit. The second control unit uses the adjustment information transmitted respectively from the plurality of image forming devices and determines the adjustment values to be used in the plurality of image forming devices. The second communication unit transmits the adjustment update information including the second adjustment value information indicating the determined adjustment values respectively to the plurality of image forming devices.

Hereinafter, the image forming system according to an embodiment is described with reference to the drawings. In each diagram, the same configuration is denoted by the same reference numeral. For convenience of description, in the embodiment, a value of an electric resistance is referred to as a resistance value. For convenience of description, in the embodiment, a value of a voltage is referred to as a voltage value. For convenience of description, in the embodiment, the value of the electric current is referred to as an electric current value. As an example of the image forming system according to the embodiment, an image forming system 100 is described.

(Configuration of Image Forming System)

With reference to FIG. 1, the configuration of the image forming system 100 is described.

FIG. 1 is a diagram illustrating an example of a configuration of the image forming system 100. The image forming system 100 include a plurality of image forming devices 1 and a server 2. In FIG. 1, for the simplification of the diagram, only three of the image forming devices 1 among the plurality of image forming devices included in the image forming system 100 are illustrated.

A portion or all of the plurality of image forming devices 1 may be configured to be provided in the same building, may be configured to be provided in the same room, and may be configured to be provided in the other same space. A portion or all of the plurality of image forming devices 1 may be configured to be provided in the different buildings, may be configured to be provided in the different rooms, and may be configured to be provided in the other different spaces. As illustrated in FIG. 1, the image forming system 100 may be configured so that a communication device 3, another image forming device 1, and the like are connected to each other under the control of a certain image forming device 1.

Each of the plurality of image forming devices 1 is communicably connected to the server 2 via a network 4. Any network may be used as the network 4. For example, the network 4 may be the Internet or may be a local area network (LAN).

A portion or all of the plurality of image forming devices 1 may have the same configuration or may have different configurations without deteriorating the function of the image forming system 100. For example, a case where all of the plurality of image forming devices 1 have the same configuration is described.

The image forming device 1 may be any device as long as the device can perform printing by an image forming process and an image fixing process. The image forming process is a process of forming an image on a print medium. In other words, the image forming process is a process of transferring a toner image to a print medium. The image fixing process is a process of fixing an image formed to a print medium. In other words, the image fixing process is a process of fixing the toner image transferred to the print medium to the print medium. For example, the image forming device 1 is a multi function peripheral (MFP).

Any medium can be used as the print medium, as long as the image forming device 1 can form an image on the medium. Examples of the print medium include printing paper on which characters, images, and the like are formed.

In the image forming process, the image forming device 1 generates a toner image of the image to be formed on the print medium, transfers the generated toner image to the transfer body, and transfers the toner image transferred to the transfer body to the print medium. In case of transferring the toner image to the print medium, the image forming device 1 applies a voltage between the transfer body and the print medium. The image forming device 1 applies the voltage in order to generate the electric current that flows between the transfer body and the print medium and promote the movement of the toner image from the transfer body to the print medium by this electric current. For convenience of description, in case of transferring the toner image to the print medium, the voltage applied between the transfer body and the print medium is referred to as an applied voltage. For convenience of description, the application of the applied voltage between the transfer body and the print medium is simply referred to as application of the applied voltage. Even if the applied voltage is applied by the constant voltage method, the electric current value of the electric current that flows between the transfer body and the print medium by the application of the applied voltage changes in response to the change of the environment value indicating the environment in the image forming device 1. This is because the resistance value of the print medium changes in response to the change of the corresponding environment value. The environment value is temperature in the image forming device 1, the humidity of the image forming device 1, and the like. The environment value may be the temperature outside of the image forming device 1, the humidity outside of the image forming device 1, or the like, as long as the value shows the environment in the image forming device 1. As an example, a case where the environment values are two values of the temperature in the image forming device 1 and the humidity in the image forming device 1 is described.

In order to solve this problem, if an applied voltage is applied by a constant voltage method in case of transferring a toner image from a transfer body to a print medium, an image forming device in the related art refers to an expected control value obtained by a test or the like in advance and determines a voltage value of the applied voltage. However, in the recent years, types of print media used for the image forming device increase, and thus variations of resistance values of the print media increase. As a result, in the image forming devices in the related art, the resistance value of the print medium and the expected control value becomes inconsistent. This is not preferable, because this causes the variation of the quality of the transfer of a toner image to the print medium, and thus causes the decrease in the quality of an image formed on the print medium.

Here, the image forming device 1 solves the problems by the following process.

The image forming device 1 receives an adjustment value for adjusting a voltage value of an applied voltage in response to an operation of the user and detects a resistance value of the print medium.

The adjustment value for adjusting the voltage value of the applied voltage is a value for designating a proportion for increasing and decreasing the voltage value of the applied voltage from a reference applied voltage value to the image forming device 1. The reference applied voltage value is a voltage value of an applied voltage of the image forming device 1 in an initial state (for example, a state at the time of purchase or an initialized state). For example, the image forming device 1 can change the proportion for increasing and decreasing the voltage value of the applied voltage from the reference applied voltage value in seven steps. In this case, the adjustment value is, for example, any one of seven integers of "1" to "7". For example, if "4" is set as the adjustment value, the proportion for increasing and decreasing the voltage value of the applied voltage from the reference applied voltage value is 0%. That is, if "4" is set as the adjustment value, the image forming device 1 sets the reference applied voltage value as the voltage value of the applied voltage. Therefore, in this example, the adjustment value of "4" is referred to as an adjustment value to be the reference. Whenever the adjustment value increases by 1 from "4", the proportion for increasing and decreasing the voltage value of the applied voltage from the reference applied voltage value increases by a predetermined proportion. Whenever the adjustment value decreases by 1 from "4", the proportion for increasing and decreasing the voltage value of the applied voltage from the reference applied voltage value decreases by a predetermined proportion. The predetermined proportion is, for example, 10%. In this case, for example, if "5" is set as the adjustment value, the image forming device 1 sets the voltage value obtained by increasing the reference applied voltage value by 10% as the voltage value of the applied voltage. In this case, for example, if "3" is set as the adjustment value, the image forming device 1 sets the voltage value obtained by decreasing the reference applied voltage value by 10% as the voltage value of the applied voltage.

After the reception of the adjustment value and the detection of the resistance value, the image forming device 1 transmits adjustment information including first adjustment value information indicating the received adjustment value and print medium resistance value information indicating the detected resistance value to the server 2. Thereafter, the image forming device 1 receives adjustment update information including second adjustment value information as a response to the adjustment information transmitted to the server 2 from the server 2.

The second adjustment value information is information indicating the adjustment value statistically determined by the server 2 based on the adjustment information received by the server 2 from the plurality of image forming devices 1, respectively. In other words, the second adjustment value information is information indicating a value that is highly likely to be statistically appropriate, as the adjustment value set to the image forming device 1.

After the adjustment update information is received, the image forming device 1 stores the second adjustment value information included in the adjustment update information as setting adjustment value information indicating the adjustment value set in the image forming device 1. Accordingly, in the image forming device 1, the adjustment value indicated by the second adjustment value information is set. Thereafter, the image forming device 1 determines the applied voltage based on the adjustment value indicated by the stored setting adjustment value information. Here, in the image forming device 1 in the initial state, the setting adjustment value information indicating the adjustment value to be the reference (in this example, "4") is stored in advance as the setting adjustment value information.

According to the above process, the image forming device 1 can suppress the occurrence of the variation in the quality of the transfer of the toner image to the print medium in response to the type of the print medium. As a result, the image forming device 1 can suppress the decrease of the quality of the image formed on the print medium in response to the type of the print medium. In other words, by the above process, the image forming system 100 suppresses the failure of the transfer of the toner image to the print medium in each of the image forming devices 1 so that stable image qualities can be provided to each of the image forming devices 1.

In case of determining the applied voltage, the image forming device 1 determines the voltage value of the applied voltage by using an applied voltage value table of each resistance value of the print medium, a humidity in the image forming device 1, a resistance value of the print medium, and an adjustment value set in the image forming device 1.

The applied voltage value table is a table stored in the image forming device 1 in advance for each resistance value of the print medium. FIG. 2 is a diagram illustrating an example of the applied voltage value table of the resistance value of "x1" for the print medium. The applied voltage value table is a table in which voltage values of applied voltages are stored for each combination of a plurality of categories determined in advance with respect to the humidity in the image forming device 1 and adjustment values. The plurality of corresponding categories are categories determined by dividing the area of the humidity of 0% to 100%. In the example illustrated in FIG. 2, the plurality of corresponding categories are, for example, ten categories of "0% to 10%", "11% to 20%", "21% to 30%", "31% to 40%", . . . , and "91% to 100%". The applied voltage value table is generated based on the relationship among the resistance value of the print medium, the humidity in the image forming device 1, and the applied voltage. This relationship may be a relationship specified by a test or the like performed in advance and may be a relationship specified by other methods such as a theoretical formula.

The humidity in the image forming device 1 is detected by the image forming device 1 by an environment value detection unit (not illustrated) in FIG. 1. In other words, the image forming device 1 detects the humidity in the image forming device 1 by the corresponding environment value detection unit. The environment value detection unit is a sensor that detects the environment value indicating the environment in the image forming device 1. In this example, the environment value detection unit detects the temperature in the image forming device 1 and the humidity in the image forming device 1, respectively.

The resistance value of the print medium is detected by the image forming device 1 by using a detection unit DC described below. In other words, the image forming device 1 detects the resistance value of the print medium by using the detection unit DC.

The image forming device 1 specifies the applied voltage value table associated with the resistance value of the print medium detected by the detection unit DC from the plurality of applied voltage value tables stored in advance for each resistance value of the print medium. The image forming device 1 refers to the specified applied voltage value table and determines the voltage value associated with the humidity detected by the environment value detection unit and the adjustment value indicated by the stored setting adjustment value information, as the voltage value of the applied voltage.

After the applied voltage is determined, the image forming device 1 performs the image forming process by using the determined applied voltage.

The image forming device 1 may have a configuration in which the adjustment value after being set in the image forming device 1 can be finely adjusted in response to the operation of the user and may have a configuration in which the corresponding adjustment value cannot be finely adjusted.

As described above, the adjustment information transmitted from the image forming device 1 to the server 2 is information including the first adjustment value information that indicates the adjustment value received from the user by the image forming device 1.

The first adjustment value information may be configured to indicate the adjustment values with respect to the front surface of the print medium and the back surface of the print medium and may be configured to indicate an adjustment value of any one of the front surface of the print medium and the back surface of the print medium. As an example, a case where the first adjustment value information indicates the adjustment values with respect to the front surface of the print medium and the back surface of the print medium is described. In this case, the first adjustment value information includes first front surface adjustment value information indicating the adjustment value with respect to the front surface of the print medium and first back surface adjustment value information indicating the adjustment value with respect to the back surface of the print medium. For convenience of description, as long as the first front surface adjustment value information and the first back surface adjustment value information do not have to be distinguished, the first front surface adjustment value information and the first back surface adjustment value information are collectively referred to as first adjustment value information for each surface to be printed.

In addition to such first adjustment value information, the adjustment information may be configured to include other information. As an example, a case where the adjustment information includes print medium type information, print medium resistance value information, environment value information, and printing mode information, in addition to the first adjustment value information is described. The print medium type information is information indicating the type of the print medium. The type of the print medium is, for example, "plain paper", "recycled paper", "high-quality paper", and "thick paper". The environment value information is information indicating the environment value in the image forming device 1 and is temperature information indicating the temperature in the image forming device 1 and humidity information indicating the humidity in the image forming device 1, in this example. The printing mode information is information indicating a printing mode of the image forming device 1. The printing mode of the image forming device 1 may be, for example, each of "mode for performing color printing" and "mode for performing monochrome printing", but is not limited thereto. For convenience of description, the "mode for performing color printing" is simply referred to as "color printing", and the "mode for performing monochrome printing" is simply referred to as "monochrome printing".

One or more kinds of the other information may be associated with the adjustment information. As an example, a case where two kinds of information of device identification information and installation location information are associated with the adjustment information is described. The device identification information is information with which the image forming device 1 can be identified and is, for example, an identifier (ID) for identifying the image forming device 1, a media access control (MAC) address of the image forming device 1, and the like. The installation location information is information indicating an installation location of the image forming device 1, and is for example, an ID indicating the installation location of the image forming device, an address indicating the installation location of the image forming device, a device region indicating the installation location of the image forming device, a room number indicating the installation location of the image forming device, a latitude and a longitude indicating the installation location of the image forming device 1, and the like.

FIG. 3 is a table showing examples of a plurality of kinds of adjustment information received by the server 2, respectively. Each record included in the table in FIG. 3 indicates each kind of the adjustment information received by the server 2. For example, "111" is associated with the adjustment information received by the server 2 from the image forming device 1 identified by device identification information AAA, as the installation location information. For example, five kinds of information of print medium type information indicating "plain paper", print medium resistance value information indicating "x1 Ω", environment value information indicating "30° C." and "85%", printing mode information indicating "color printing", and first adjustment value information are included in the corresponding adjustment information. Further, first front surface adjustment value information indicating "−2" and first back surface adjustment value information indicating "+2" are included in the first adjustment value information of the corresponding adjustment information. In the example illustrated in FIG. 3, the first front surface adjustment value information indicates the adjustment value as the difference from the adjustment value to be the reference. If the adjustment value to be the reference is "4", the first front surface adjustment value information indicating "−2" is information indicating "2" as the adjustment value. In the corresponding example, the first back surface adjustment value information also indicates the adjustment value as the difference from the adjustment value to be the reference. If the adjustment value to be the reference is "4", the first back surface adjustment value information indicating "+2" is information indicating "6" as the adjustment value. The image forming device 1 generates information including five kinds of information received from the user in response to the operation of the user and print medium resistance value information indicating the resistance value of the detected print medium, as the adjustment information illustrated in FIG. 3. The image forming device 1 stores the generated adjustment information and transmits the generated adjustment information to the server 2. The server 2 receives the plurality of kinds of adjustment information transmitted to the server 2. The server 2 collects the plurality of kinds of received adjustment information in one table such as the table illustrated in FIG. 3 or in a plurality of tables and stores the table as image forming device information table. As an example, a case where the server 2 stores the plurality of kinds of received adjustment information in a state of being collected in one table such as the table illustrated in FIG. 3 is described.

The server 2 is configured by one or more information process devices. The server 2 determines the adjustment values for setting the plurality of image forming devices 1, respectively. Specifically, the server 2 receives adjustment information from each of the plurality of image forming devices 1 and statistically obtains the adjustment values set in each of the plurality of image forming devices 1 by using the received adjustment information. More specifically, the server 2 determines the adjustment values for each surface to be printed (the front surface of the print medium and the back surface of the print medium) according to the combination of the print medium type information, the print medium resistance value information, the environment value information, and the printing mode information included in the plurality of kinds of adjustment information, respectively. The server 2 generates the adjustment update information including the second adjustment value information indicating the determined adjustment value. The server 2 transmits the generated adjustment update information to the plurality of image forming devices 1, respectively.

The server 2 may be configured to classify for example, the plurality of image forming devices 1 into a plurality of groups based on the predetermined reference. The predetermined reference is the same location, the same region, or the like where the plurality of image forming devices 1 are installed. In this case, the server 2 determines the adjustment value of the same group by using the adjustment information transmitted from the image forming devices 1 belonging to the same group. Instead of the same location, the same region, or the like where the plurality of image forming devices 1 are installed, the predetermined reference may be other references such as the same or substantially the same environment values with respect to the plurality of image forming devices 1, respectively. If the same or substantially the same environment values with respect to the plurality of image forming devices 1 are employed as the predetermined references, a configuration in which the environment value information is not included in the adjustment information may be provided. The server 2 may be configured not to classify the plurality of image forming devices 1 into a plurality of groups.

The communication device 3 is a device instructing the image forming device 1 to perform printing. The communication device 3 is, for example, an information process device such as a personal computer, a notebook computer, a tablet terminal, or a mobile terminal.

(Configuration of Image Forming Device)

Figure 4:
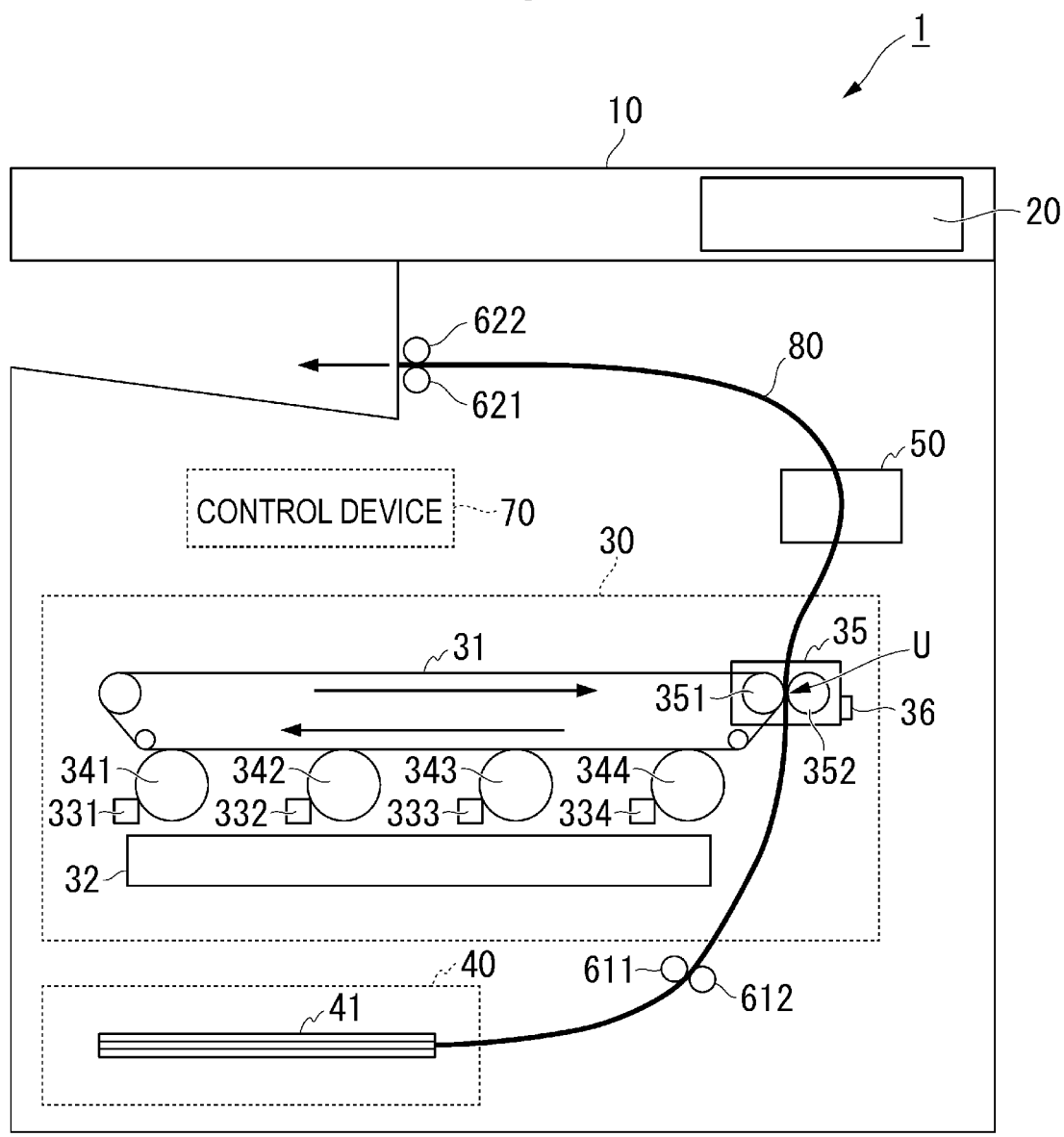
FIG. 4 is a diagram illustrating an example of the entire configuration of an image forming device 1.

With reference to FIG. 4, the configuration of the image forming device 1 is described. FIG. 4 is a diagram illustrating an example of the entire configuration of the image forming device 1.

The image forming device 1 includes an image reading unit 10, a control panel 20, an image forming unit 30, a print medium containing unit 40, a fixing device 50, a conveyance roller 611, a conveyance roller 612, a paper ejection roller 621, a paper ejection roller 622, and a control device 70.

The image reading unit 10 reads image information to be read based on brightness and darkness of light. For example, the image reading unit 10 reads the image information of a drawn image to be read that is set on a document reading table, as the image information to be read. The image reading unit 10 stores the read image information. The image information stored in the image forming device 1 may be transmitted to the other information process devices via the network and may be used for forming an image on a print medium by the image forming unit 30.

The control panel 20 includes a display unit and an operation unit. The display unit is a display device such as a liquid crystal display or an organic electro luminescence (EL) display. The display unit displays various kinds of information, an adjustment screen ST, and the like relating to the image forming device 1 in response to the control from the control device 70. The adjustment screen ST is a screen including a graphical user interface (GUI) for receiving an input of the adjustment value for adjusting the applied voltage. The image forming device 1 generates the above adjustment information based on the adjustment value input from the user via the adjustment screen ST. The operation unit includes a plurality of buttons or the like. The operation unit receives the operation of the user. For example, the operation unit receives an instruction of performing printing and the input of the adjustment value. The operation unit outputs a signal according to the operation performed by the user to the control device 70. The display unit and the operation unit may be configured as an integrated touch panel. The control panel 20 is an example of a receiving unit.

The image forming unit 30 performs an image forming process. Specifically, the image forming unit 30 forms an image indicated by the image information read by the image reading unit 10 or an image indicated by the image information received via a communication path, on the print medium. More specifically, the image forming unit 30 transfers the toner image of this image to the print medium.

The image forming unit 30 includes a transfer belt 31, an exposure unit 32, a plurality of developing devices 33, a plurality of photoconductor drums 34, and a transfer unit 35. As an example, a case where the image forming unit 30 includes four developing devices 33 of the developing device 331, the developing device 332, the developing device 333, and the developing device 334 as the plurality of developing devices 33 is described. As an example, a case where the image forming unit 30 includes four photoconductor drums 34 of the photoconductor drum 341, the photoconductor drum 342, the photoconductor drum 343, and the photoconductor drum 344 is described.

The transfer belt 31 is an endless intermediate transfer body. The transfer belt 31 rotates in a direction (counterclockwise) indicated by an arrow in FIG. 4 by the rotation of rollers.

The exposure unit 32 is provided at a position of facing the photoconductor drums 34 between the developing devices 33 and chargers (not illustrated). The exposure unit 32 respectively irradiates the surfaces (photoconductor layers) of the four photoconductor drums 34 with laser beams based on the image information. The main scanning direction in the image forming device 1 is a direction in which the laser beams are deflected to the four photoconductor drums 34. The sub-scanning direction in the image forming device 1 is a direction orthogonal to the main scanning direction. For example, the main scanning direction is identical to the axis direction of the four photoconductor drums 34. For example, the sub-scanning direction is identical to the rotation direction of the transfer belt 31.

By the irradiation with the laser beam, electric charges on the surfaces (photoconductor layers) of the respective four photoconductor drums 34 disappear. As a result, electrostatic patterns are formed on the surfaces of the four photoconductor drums 34 at the positions irradiated with the laser beams. That is, by the irradiation with the laser beams by the exposure unit 32, the electrostatic latent images are formed on the surfaces of the four photoconductor drums 34. The exposure unit 32 may use Light Emitting Diode (LED) light instead of the laser beams. The exposure unit 32 performs irradiation with the laser beams based on the image information in response to the control from the control device 70.

The developing device 331 develops the electrostatic latent image on the surface of the photoconductor drum 341 with a toner of yellow (Y). The developing device 332 develops the electrostatic latent image on the surface of the photoconductor drum 342 with a toner of magenta (M). The developing device 333 develops the electrostatic latent image on the surface of the photoconductor drum 343 with a toner of cyan (C). The developing device 334 develops the electrostatic latent image on the surface of the photoconductor drum 344 with a toner of black (K).

The developing device 331 forms a toner image as a visible image on the photoconductor drum 341. The developing device 332 forms a toner image as a visible image on the photoconductor drum 342. The developing device 333 forms a toner image as a visible image on the photoconductor drum 343. The developing device 334 forms a toner image as a visible image on the photoconductor drum 344. The toner images respectively formed on the four photoconductor drums 34 are transferred (primary transfer) to the transfer belt 31 by a plurality of primary transfer rollers (not illustrated). The plurality of primary transfer rollers are provided at the positions facing the four photoconductor drums with the transfer belt 31 interposed therebetween.

The transfer unit 35 includes an opposing roller 351 and a secondary transfer roller 352. The transfer unit 35 transfers the toner image on the transfer belt 31 to the print medium in a secondary transfer position U. The secondary transfer position U is a position where the opposing roller 351 and the secondary transfer roller 352 face each other with the transfer belt 31 interposed therebetween. For example, the transfer unit 35 applies the applied voltage in response to the control from the control device 70 and transfers the toner image on the transfer belt 31 to the print medium.

Figure 5:
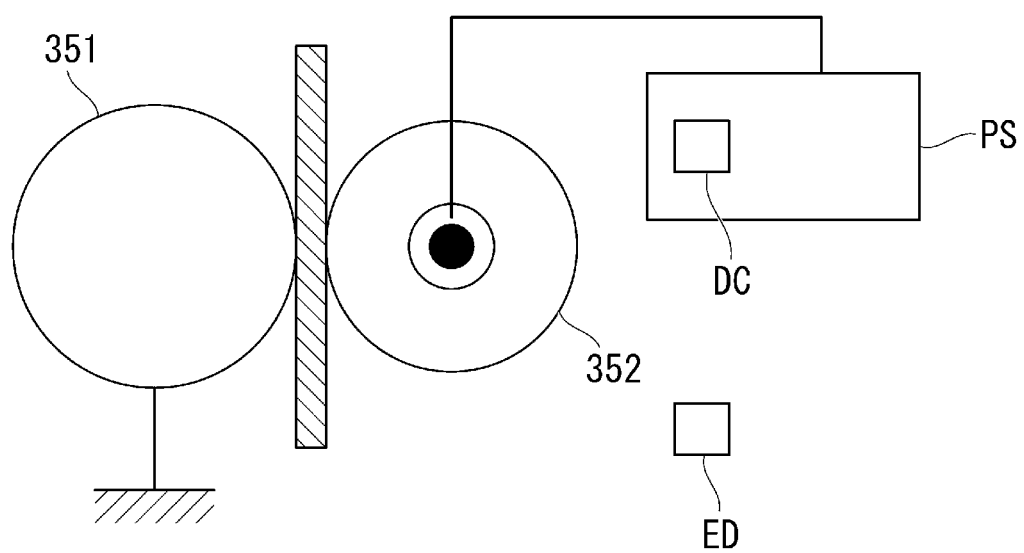
FIG. 5 is a diagram illustrating an example of a configuration of a transfer unit 35.

FIG. 5 is a diagram illustrating an example of the configuration of the transfer unit 35. The transfer unit 35 includes a voltage source PS together with the opposing roller 351 and the secondary transfer roller 352. The transfer unit 35 controls the voltage source PS in response to the control from the control device 70 and applies the applied voltage between the secondary transfer roller 352 and the grounded opposing roller 351 from the secondary transfer roller 352. Accordingly, the transfer unit 35 applies the applied voltage of the voltage value according to the control from the control device 70 between the transfer body and the print medium passing through a portion between the opposing roller 351 and the secondary transfer roller 352, from the voltage source PS. That is, the transfer body in this case means the transfer belt 31 and the secondary transfer roller 352.

The voltage source PS is further provided with the detection unit DC.

If the print medium does not pass through the transfer unit 35, the detection unit DC detects the resistance value of the transfer body. If the print medium passes through the transfer unit 35, the detection unit DC detects the total value of the resistance value of the transfer body and the resistance value of the print medium. The detection unit DC detects the value obtained by subtracting the detected resistance value of the transfer body from the detected corresponding total value as the resistance value of the print medium. The detection unit DC outputs the print medium resistance value information indicating the detected resistance value of the print medium to the control device 70. For convenience of description, the total value of the resistance value of the transfer body and the resistance value of the print medium is simply referred to as a total value.

The detection unit DC detects an electric current flowing from the secondary transfer roller 352 to the opposing roller 351 by the application of the applied voltage by the voltage source PS, for example, if the print medium does not pass through the transfer unit 35. Accordingly, the detection unit DC can detect the resistance value of the transfer body based on the detected electric current and Ohm's law. For example, if the print medium passes through the transfer unit 35, the detection unit DC detects the electric current flowing from the secondary transfer roller 352 to the opposing roller 351 by the application of the applied voltage by the voltage source PS. Accordingly, the detection unit DC can detect the total value based on the detected electric current and Ohm's law.

The circuit configurations of the voltage source PS and the detection unit DC may have a circuit configuration well-known in the art and may have a circuit configuration to be developed from now on. Therefore, in FIG. 4, the voltage source PS and the detection unit DC are drawn as rectangular objects.

The transfer unit 35 further includes an environment value detection unit ED that is an example of the above environment value detection unit. The environment value detection unit ED may be any sensor as long as the sensor can detect the environment value. In this example, the environment value detection unit ED is a sensor that detects the temperature and the humidity. Instead of the configuration in which the environment value detection unit ED is included in the transfer unit 35, the environment value detection unit ED may be configured to be included in the other portions, the other members, or the like, where the environment value in the image forming device 1 can be detected.

The print medium containing unit 40 includes one or more paper feeding cassettes. The paper feeding cassette stores a print medium of a predetermined size and a predetermined type. In the example illustrated in FIG. 3, a print medium 41 is contained in the paper feeding cassettes of the print medium containing unit 40. The paper feeding cassette includes a pick-up roller. The pick-up roller picks up the print media from the paper feeding cassette one by one. The pick-up roller supplies the picked-up print medium to a conveyance unit 80.

The fixing device 50 performs the image fixing process. Specifically, the fixing device 50 fixes the image (for example, the toner image) formed on the print medium to the print medium by heating and pressurizing the print medium.

The conveyance roller 611 and the conveyance roller 612 supply the print medium fed from the paper feeding cassettes to the image forming unit 30. The conveyance rollers 611 and 612 are installed at the opposing positions.

The paper ejection roller 621 and the paper ejection roller 622 ejects the print medium on which the image is formed by the fixing device 50, to the ejection unit. The paper ejection roller 621 and the paper ejection roller 622 are installed at the opposing positions.

The control device 70 controls each functional unit of the image forming device 1.

The conveyance unit 80 conveys the print medium. The conveyance unit 80 includes a conveyance path and a plurality of rollers (not illustrated). The conveyance path included in the conveyance unit 80 is a path through which the print medium is conveyed. The plurality of rollers included in the conveyance unit 80 convey the print medium by rotation in response to the control of the control device 70.

(Hardware Configuration of Image Forming Device)

Figure 6:
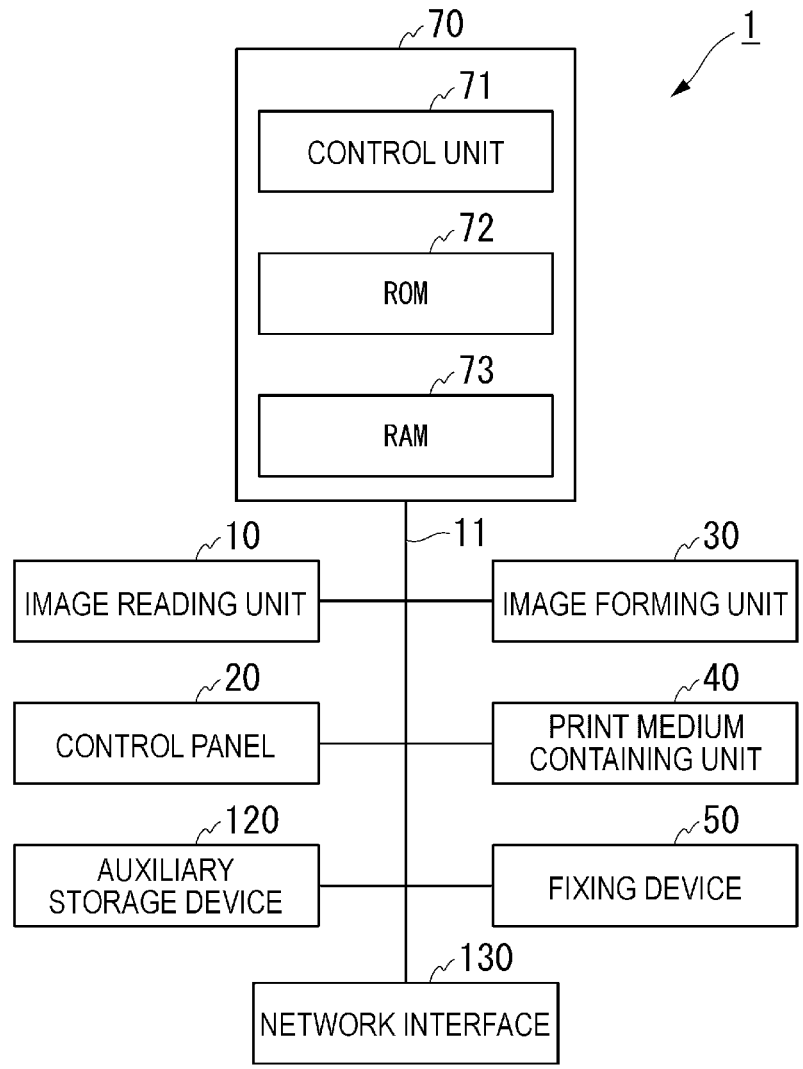
FIG. 6 is a block diagram illustrating a hardware configuration of the image forming device 1 according to an embodiment.

FIG. 6 is a block diagram illustrating a hardware configuration of the image forming device 1 according to the embodiment. FIG. 6 illustrates only the characteristic hardware configuration of the image forming device 1 according to the present embodiment.

The image forming device 1 includes the image reading unit 10, the control panel 20, the image forming unit 30, the print medium containing unit 40, the fixing device 50, the control device 70, an auxiliary storage device 120, and a network interface 130. Functional units included in the image forming device 1 are connected to each other so that data communication can be performed via a system bus 11.

The image reading unit 10, the control panel 20, the image forming unit 30, the print medium containing unit 40, and the fixing device 50 are already described, and thus the description thereof is omitted. The control device 70, the auxiliary storage device 120, and the network interface 130 are described, respectively.

The control device 70 includes a control unit 71, a read only memory (ROM) 72, and a random access memory (RAM) 73.

The control unit 71 is configured to include, for example, a processor such as a central processing unit (CPU) and a graphics processing unit (GPU). The control unit 71 controls the operation of each functional unit of the image forming device 1. The control unit 71 performs various processes by loading a program stored in the ROM 72 into the RAM 73 and executing the loaded program. In addition, the Application Specific Integrated Circuit (ASIC) may have an appropriate function embodied by the control unit 71. The ASIC is a dedicated circuit for embodying a specific function. The control unit 71 is an example of the first control unit.

The ROM 72 stores a program for operating the control unit 71.

The RAM 73 is a memory that temporarily stores various kinds of information used by the functional units in the image forming device 1. The RAM 73 may store digital data generated by the image reading unit 10. The RAM 73 may temporarily store jobs and job logs.

The auxiliary storage device 120 is a storage device, for example, including a hard disk or a solid state drive (SSD). The auxiliary storage device 120 stores various kinds of information. The various kinds of information stored in the auxiliary storage device 120 are, for example, digital data, jobs, job logs, adjustment information, setting adjustment value information, and applied voltage value table.

The network interface 130 transmits and receives data with an external device. Here, the external device includes, for example, the other image forming devices 1, the server 2, and the communication device 3. The network interface 130 operates as an input interface, and receives print data, instruction, adjustment update information, and the like that are transmitted from the external device to the image forming device 1. Examples of the instruction transmitted from the external device include an instruction of performing printing. In addition, the network interface 130 operates as the output interface and transmits the adjustment information to the server 2. The network interface 130 transmits the adjustment information whenever the adjustment value set in the image forming device 1 is adjusted by the user. In addition to this, the network interface 130 may be configured to transmit the adjustment information to the server 2 at the time set in advance. In this case, the network interface 130 transmits the adjustment information stored in the auxiliary storage device 120 to the server 2. If a plurality of kinds of adjustment information in the past are stored in the auxiliary storage device 120, and adjustment information is transmitted at the time set in advance, the network interface 130 transmits the latest adjustment information to the server 2. The network interface 130 is an example of a first communication unit.

(Configuration of Server)

Figure 7:
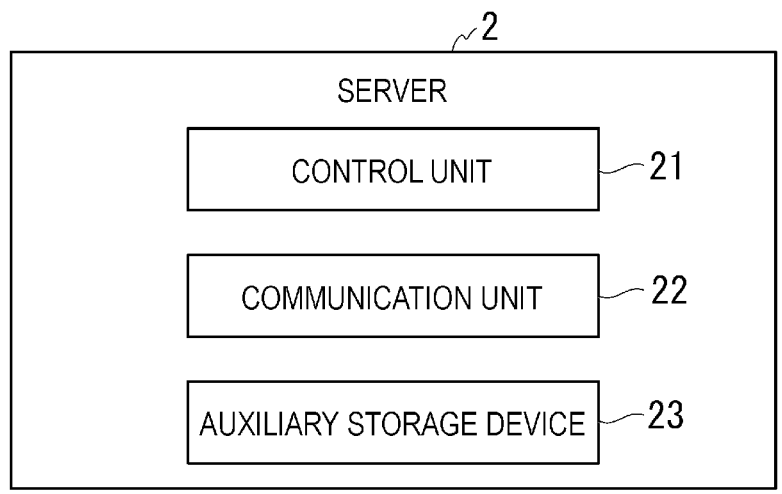
FIG. 7 is a diagram illustrating an example of a configuration of the server 2.

FIG. 7 is a diagram illustrating an example of the configuration of the server 2. The server 2 includes a control unit 21, a communication unit 22, and an auxiliary storage device 23.

The control unit 21 is configured to include, for example, a processor such as a CPU and a GPU. The control unit 21 controls the operation of each functional unit of the server 2. The appropriate function embodied by the control unit 21 may be configured by the ASIC. The control unit 21 is an example of a second control unit.

The communication unit 22 performs communication with the image forming device 1. The communication unit 22 receives, for example, the adjustment information transmitted from the image forming device 1. The communication unit 22 transmits, for example, adjustment update information to the image forming device 1. The communication unit 22 is an example of a second communication unit.

The auxiliary storage device 23 is a storage device, for example, including a hard disk and an SSD. The auxiliary storage device 23 stores the image forming device information table and the applied voltage adjustment value table described above. The applied voltage adjustment value table is a table in which values of applied voltages with respect to a plurality of combinations of adjustment values and humidity for each resistance value of the print medium are stored.

FIG. 8 is a diagram illustrating an example of the applied voltage adjustment value table.

The applied voltage adjustment value table is a table in which values of the applied voltages are stored for each combination of the resistance values of the print media, adjustment values, and humidity. The applied voltage adjustment value table is stored in the auxiliary storage device 23 of the server 2 in each combination of types of print media, printing modes, front surfaces of the print media, and back surfaces of the print media. For example, the server 2 stores one applied voltage adjustment value table in the combination of "plain paper", "color printing", and "front surface of print medium". For example, the server 2 stores one applied voltage adjustment value table in the combination of "plain paper", "color", and "back surface of print medium". For example, the server 2 stores one applied voltage adjustment value table in the combination of "plain paper", "monochrome printing", and "front surface of print medium". For example, the server 2 stores one applied voltage adjustment value table, for example, in the combination of "plain paper", "monochrome printing", and "back surface of print medium". Such an applied voltage adjustment value table is generated by the server 2 based on the plurality of kinds of adjustment information stored in the server 2.

Figure 9:
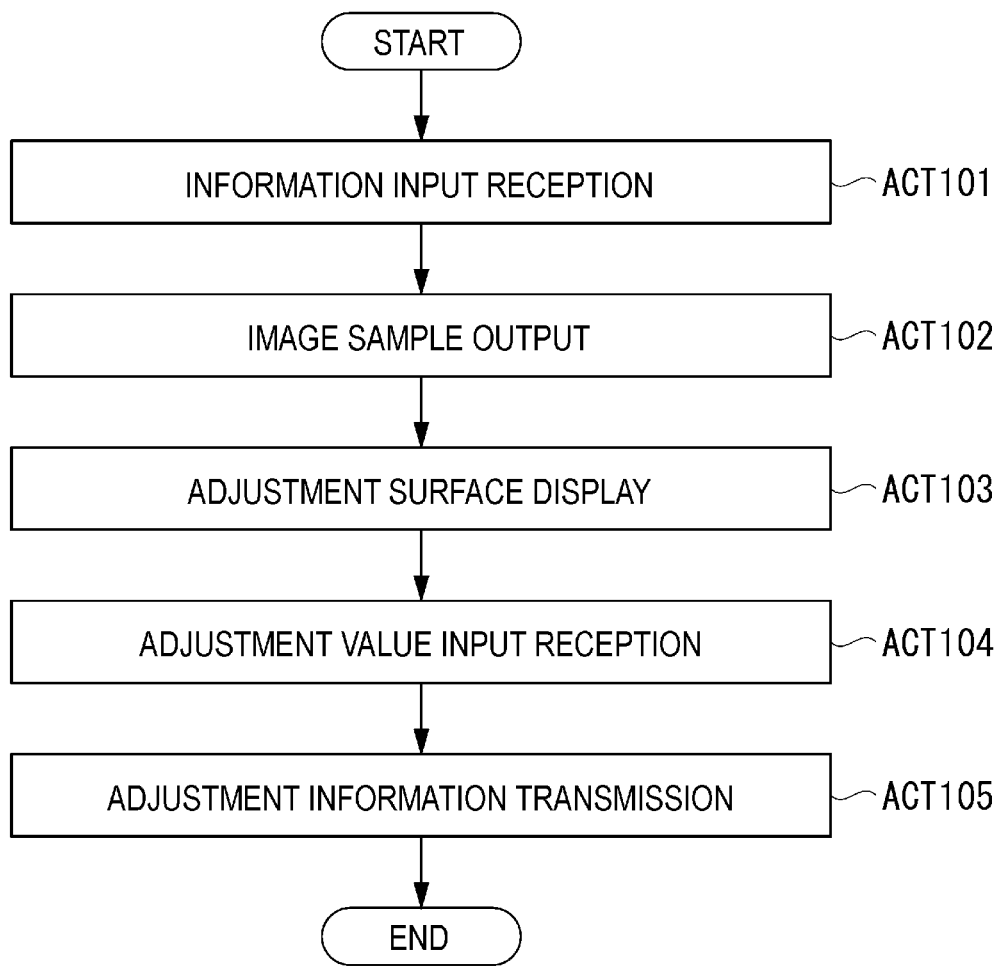
FIG. 9 is a diagram illustrating a flow of an adjustment information transmission process performed by the image forming device 1.

FIG. 9 is a diagram illustrating an example of a flow of an adjustment information transmission process performed by the image forming device 1 according to the embodiment. FIG. 9 illustrates a case where adjustment information is transmitted to the server 2 at the timing when the adjustment value is input. The process of the flowchart illustrated in FIG. 9 starts if an instruction of adjusting the voltage value of the applied voltage is received from the user.

After the instruction of adjusting the voltage value of the applied voltage is received, the control unit 71 receives inputs of settings respectively for the print medium type information, printing mode information, and printing surface designation information for designating a surface to be printed, on the control panel 20 (ACT 101). The printing surface designation information is information of designating at least one of the front surface of the print medium and the back surface of the print medium as a surface on which an image is to be formed.

Subsequently, the control unit 71 controls the image forming unit 30 and the fixing device 50 and prints an image sample P in response to the input setting (ACT 102).

Figure 10:
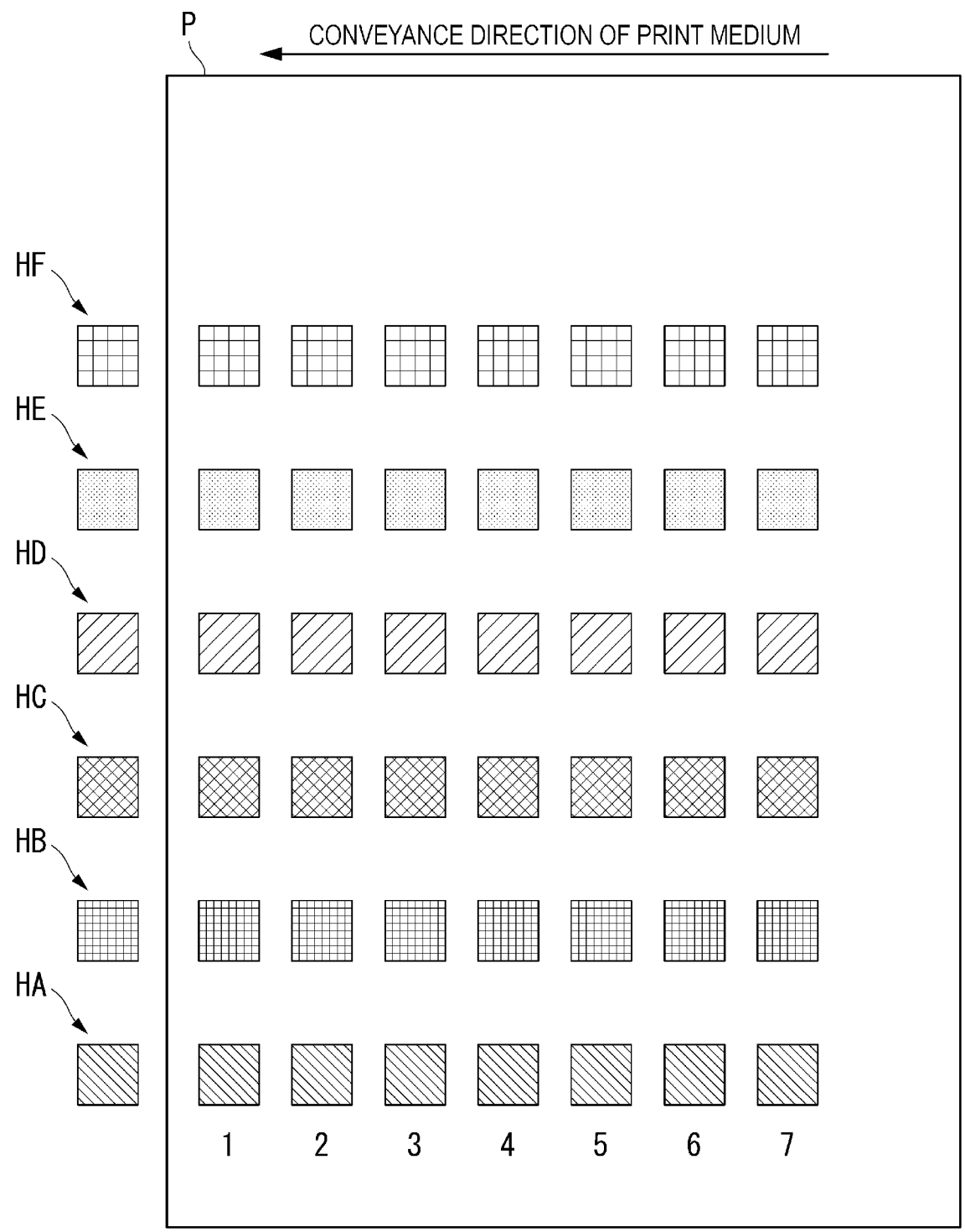
FIG. 10 is a diagram illustrating an example of an image sample P printed in ACT 102.

FIG. 10 is a diagram illustrating an example of the image sample P printed in ACT 102. FIG. 10 illustrates a conveyance direction of the print medium by an arrow. FIG. 10 illustrates the image sample P in a case where color printing is set for the printing mode. In the image sample P, patches with different densities are continuously printed in the conveyance direction of the print medium, for each of six colors of black obtained by mixing three colors of red, green, and blue, blue, red, green, gray (halftone), and monochromatic black. The difference of this density is not caused by the difference of the document densities but caused by the difference of the applied voltages. In other words, in the printing of the image sample P in ACT 102, the document density is constant or substantially constant in any directions. A patch of a hatching HA illustrated in FIG. 10 is a black patch obtained by mixing three colors of red, green, and blue. A patch of a hatching HB illustrated in FIG. 10 is a blue patch. A patch of a hatching HC illustrated in FIG. 10 is a red patch. A patch of a hatching HD illustrated in FIG. 10 is a green patch. A patch of a hatching HE illustrated in FIG. 10 is a gray patch. A patch of a hatching HF illustrated in FIG. 10 is a monochrome black patch. For example, these patches are continuously printed so that the density is decreased as going in the corresponding conveyance direction. In FIG. 10, in order to simplify the diagram, the difference of densities for each patch is not illustrated. Values of "1" to "7" shown in the image sample P are the adjustment values. Six patches arranged on the right side of each adjustment value shown in the image sample P in FIG. 10 are patches corresponding to adjustment values, respectively. The density of the patch corresponding to the adjustment value of "4" shows the density of a case where printing is performed by using the reference applied voltage value as the applied voltage in the image forming device 1 that prints the image sample P. The user can determine which density is appropriate for printing by looking at the image sample P. Even if the reference applied voltage value is the same value, the density of the patch corresponding to the adjustment value of "4" in the image sample P is different due to the environment in the image forming device 1. Here, the user looks at the image sample P and determines the adjustment value corresponding to the patch determined to have an appropriate density for the user.

Figure 11:
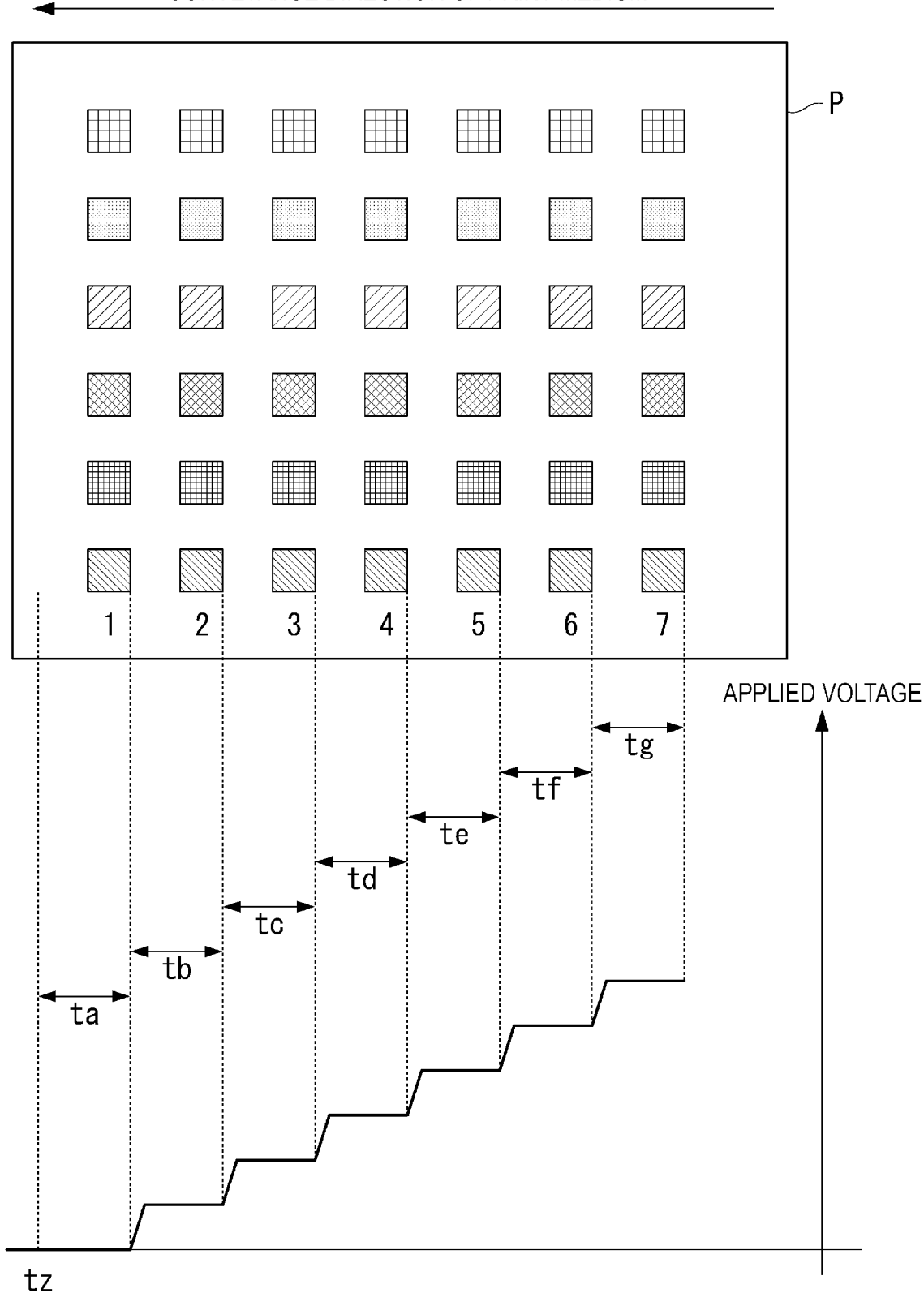
FIG. 11 is a diagram illustrating a relationship between a timing when a plurality of patches are printed on the image sample P and a timing when a total value of a resistance value of the transfer body and a resistance value of a print medium is detected.

In case of performing such printing of the image sample P, the control unit 71 controls the detection unit DC and detects the total value. FIG. 11 is a diagram illustrating a relationship between a timing when a plurality of patches are printed on the image sample P and a timing when a total value is detected. The control unit 71 prints the patches of six colors arranged in the direction orthogonal to the conveyance direction of the print medium, whenever a predetermined period of time t elapses from a timing t0 illustrated in FIG. 11. A period of time to illustrated in FIG. 11 indicates a period of time until the predetermined period of time t elapses from a timing tz. A period of time tb illustrated in FIG. 11 indicates a period of time until the predetermined period of time t elapses from a timing when a period of time t1 ends. A period of time tc illustrated in FIG. 11 indicates a period of time from a timing when the period of time tb ends to a timing when the predetermined period of time t elapses. A period of time td illustrated in FIG. 11 indicates a period of time from a timing when the period of time tc ends to a timing when the predetermined period of time t elapses. A period of time te illustrated in FIG. 11 indicates a period of time from a timing when the period of time td ends to a timing when the predetermined period of time t elapses. A period of time tf illustrated in FIG. 11 indicates a period of time from a timing when the period of time te ends to a timing when the predetermined period of time t elapses. A period of time tg illustrated in FIG. 11 indicates a period of time from a timing when the period of time tf ends to a timing when the predetermined period of time t elapses. The periods of time ta to tg can be can be respectively distinguished into the first half periods of time and the second half periods of time. The first half periods of time of the respective periods of time ta to tg are periods of time when the patches are not printed. The second half periods of time in the periods of time ta to tg are periods of time when the patches are printed. The corresponding first half period of time and the corresponding second half period of time may be the periods of time with the same length and may be the periods of time with the different lengths. The control unit 71 controls the voltage source PS and prints the patches while changing the applied voltages for each of the periods of time ta to tg. In the example illustrated in FIG. 11, the voltage value of the applied voltage during the period of time td is the reference applied voltage value. Therefore, in the corresponding example, the voltage value of the applied voltage during the period of time tc is a value obtained by subtracting the voltage value of 10% of the reference applied voltage value from the reference applied voltage value. In the corresponding example, the voltage value of the applied voltage during the period of time tb is a value obtained by subtracting the voltage value of 20% of the reference applied voltage value from the reference applied voltage value. In the corresponding example, the voltage value of the applied voltage during the period of time ta is a value obtained by subtracting the voltage value of 30% of the reference applied voltage value from the reference applied voltage value. In the corresponding example, the voltage value of the applied voltage during the period of time te is a value obtained by adding the voltage value of 10% of the reference applied voltage value to the reference applied voltage value. In the corresponding example, the voltage value of the applied voltage during the period of time tf is a value obtained by adding the voltage value of 20% of the reference applied voltage value to the reference applied voltage value. In the corresponding example, the voltage value of the applied voltage during the period of time tg is a value obtained by adding the voltage value of 30% of the reference applied voltage value to the reference applied voltage value. Therefore, the periods of time t1 to t7 are periods of time that are associated with the adjustment values of seven steps, respectively. Specifically, the period of time ta is a period of time associated with the adjustment value of "1", the period of time tb is a period of time associated with the adjustment value of "2", the period of time tc is a period of time associated with the adjustment value of "3", the period of time td is a period of time associated with the adjustment value of "4", the period of time te is a period of time associated with the adjustment value of "5", the period of time tf is a period of time associated with the adjustment value of "6", and the period of time tg is a period of time associated with the adjustment value of "7". In this manner, the control unit 71 prints the patches of six colors corresponding to the adjustment values of the seven steps, respectively. Also, the control unit 71 detects the total values by the detection unit DC for each of the periods of time ta to tg.

Meanwhile, the control unit 71 controls the voltage source PS at the timing after the printing of the image sample P starts and the timing before the print medium on which the image sample P is printed starts to pass through the secondary transfer position U, and applies the voltage of the voltage value determined in advance to the secondary transfer roller 352. At the period of time when this voltage is applied to the secondary transfer roller 352, the control unit 71 controls the detection unit DC and detects the resistance value of the transfer body. The control unit 71 may be configured to detect the resistance value of the transfer body at the timing after the printing of the image sample P ends and the timing when the print medium does not pass through the secondary transfer position U.

The control unit 71 detects the resistance value of the print medium if the printing is performed with respect to the adjustment values of the seven steps based on the total values respectively detected for the periods of time ta to tg and the resistance value of the detected transfer body. In ACT 102, the resistance value of the print medium is detected by the control unit 71.

The control unit 71 causes the control panel 20 to display the adjustment screen ST at the timing when the printing of the image sample P is completed (ACT 103). The timing when the printing of the image sample P is completed may be the timing when the image sample P is ejected to the ejection unit and may be the timing when the image fixing process by the fixing device 50 ends. The image forming device 1 may be configured to detect the ejection of the image sample P to the ejection unit or the end of the image fixing process by the fixing device 50 by a sensor (not illustrated) and may be configured to detect the same by other methods. The control unit 71 may be configured to cause the control panel 20 to display the adjustment screen ST at the timing when the process of ACT 101 ends.

Figure 12:
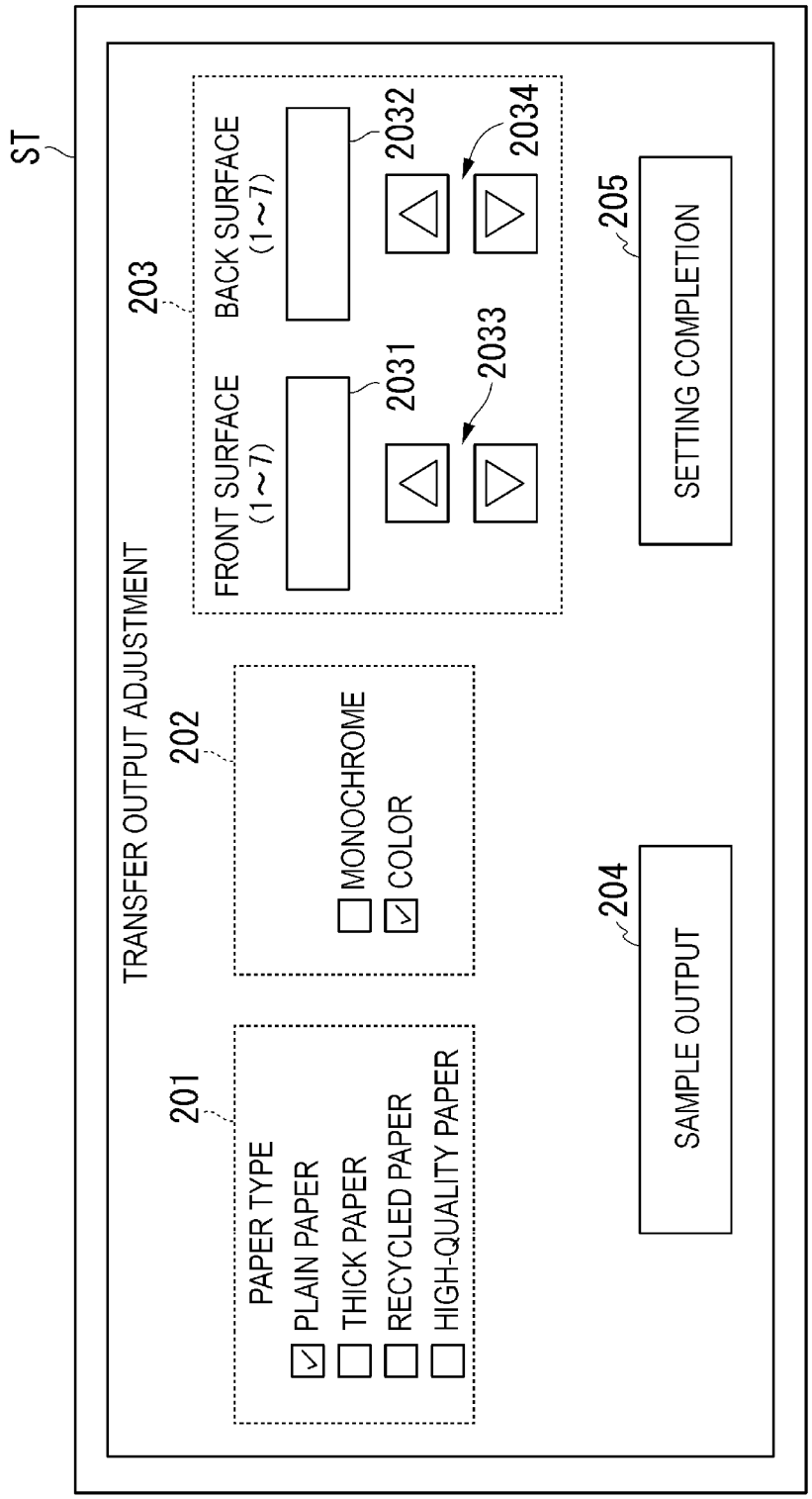
FIG. 12 is a diagram illustrating an example of an adjustment screen ST.

FIG. 12 is a diagram illustrating an example of the adjustment screen ST. As illustrated in FIG. 12, a type selection area 201, a printing mode selection area 202, an adjustment value input area 203, a sample output button 204, and a setting completion button 205 are included in the adjustment screen ST. The type selection area 201 is an area where information indicating a type of the print medium is displayed. In the example illustrated in FIG. 12, as the information indicating the type of the print medium, four kinds of information of "plain paper", "thick paper", "recycled paper", and "high-quality paper" are displayed on the type selection area 201. In the type selection area 201, a check mark is displayed in a check box corresponding to the information indicating the type of the print medium input in ACT 101. In the corresponding example, a check mark is displayed in a check box corresponding to "plain paper". If the user desires to change the type of the print medium in the adjustment screen ST, the user can change the type of the print medium by selecting the check box corresponding to the information indicating the type of the desired print medium in the type selection area 201.

The printing mode selection area 202 is an area where the information indicating the printing mode is displayed. In FIG. 12, "monochrome printing" and "color printing" are displayed in the printing mode selection area 202, as the information indicating the printing mode. In the printing mode selection area 202, a check mark is displayed in the check box corresponding to the information indicating the printing mode that is input in ACT 101. In the example illustrated in FIG. 12, a check mark is displayed in the check box corresponding to "color printing". If the user desires to change the printing mode in the adjustment screen ST, the user can change the printing mode by selecting the check box corresponding to the information indicating the desired printing mode in the printing mode selection area 202.

The adjustment value input area 203 is an area for inputting the desired adjustment value by the user. In the example illustrated in FIG. 12, an area 2031 where the adjustment value that is input by the user with respect to the printing on the front surface of the print medium is displayed and an area 2032 where the adjustment value that is input by the user with respect to the printing on the back surface of the print medium is displayed are displayed are displayed on the adjustment value input area 203. In the corresponding example, up and down keys 2033 for increasing and decreasing the adjustment value displayed in the area 2031 by one and up and down keys 2034 for increasing and decreasing the adjustment value displayed in the area 2032 by one are further displayed in the adjustment value input area 203. The user can increase and decrease the adjustment value displayed in the area 2031 by one by operating the up and down keys 2033. The user can increase and decrease the adjustment value displayed in the area 2032 by one by operating the up and down keys 2034. In the image forming device 1 in the initial state, among the adjustment values indicated by the setting adjustment value information stored in the auxiliary storage device 23, the adjustment value of "4" with respect to the printing on the front surface of the print medium is displayed in the area 2031. In the image forming device 1 at the initial state, among the adjustment values indicated by the setting adjustment value information stored in the auxiliary storage device 23, the adjustment value of "4" with respect to the printing on the back surface of the print medium is displayed in the area 2032.

The sample output button 204 is a button used if the image sample P is printed. If the sample output button 204 is selected, the image forming device 1 performs the process of ACT 102, again. If the sample output button 204 is selected, the image sample P under the condition that is set on the adjustment screen ST illustrated in FIG. 12 is output. The setting completion button 205 is a button used if the adjustment value input in the adjustment value input area 203 is set in the image forming device 1. If the setting completion button 205 is selected, the control unit 71 ends the process of ACT 103 and performs the process of ACT 104.

After the process of ACT 103 ends, the control unit 71 receives the input of adjustment value from the adjustment screen ST (ACT 104). For example, in ACT 104, if "5" is displayed in the area 2031, the control unit 71 receives an input of "5" as the adjustment value with respect to the printing on the front surface of the print medium. For example, in ACT 104, if "3" is displayed in the area 2032, the control unit 71 receives an input of "3" as the adjustment value with respect to the printing on the back surface of the print medium.

Subsequently, the control unit 71 generates the adjustment information based on the information received in ACT 101 (the print medium type information, printing mode information and the printing surface designation information) and the adjustment value received in ACT 104. Also, the control unit 71 controls the network interface 130 and transmits the generated adjustment information to the server 2 (ACT 105). Specifically, the control unit 71 generates the adjustment information including the print medium type information, the printing mode information, the first adjustment value information indicating the adjustment value with respect to the designated surface as the surface to be printed by the printing surface designation information (at least one of the first front surface adjustment value information and the first back surface adjustment value information), and the environment value information. At this point, the control unit 71 controls the environment value detection unit ED and obtains the environment value information indicating the environment value detected by the environment value detection unit ED from the environment value detection unit ED. The timing when the environment value information is obtained from the environment value detection unit ED may be any timing as long as the timing is the timing in the period of time from the timing when the process of ACT 101 starts to the timing when the adjustment information in ACT 105 is generated. The control unit 71 stores the generated adjustment information in the auxiliary storage device 120 and transmits the corresponding adjustment information to the server 2 by controlling the network interface 130. The control unit 71 may be configured to include the other information in the adjustment information.

After the process of ACT 105 is performed, the control unit 71 ends the process of the flowchart illustrated in FIG. 9. At this point, for example, the control unit 71 causes the control panel 20 to end the display of the adjustment screen ST.

Figure 13:
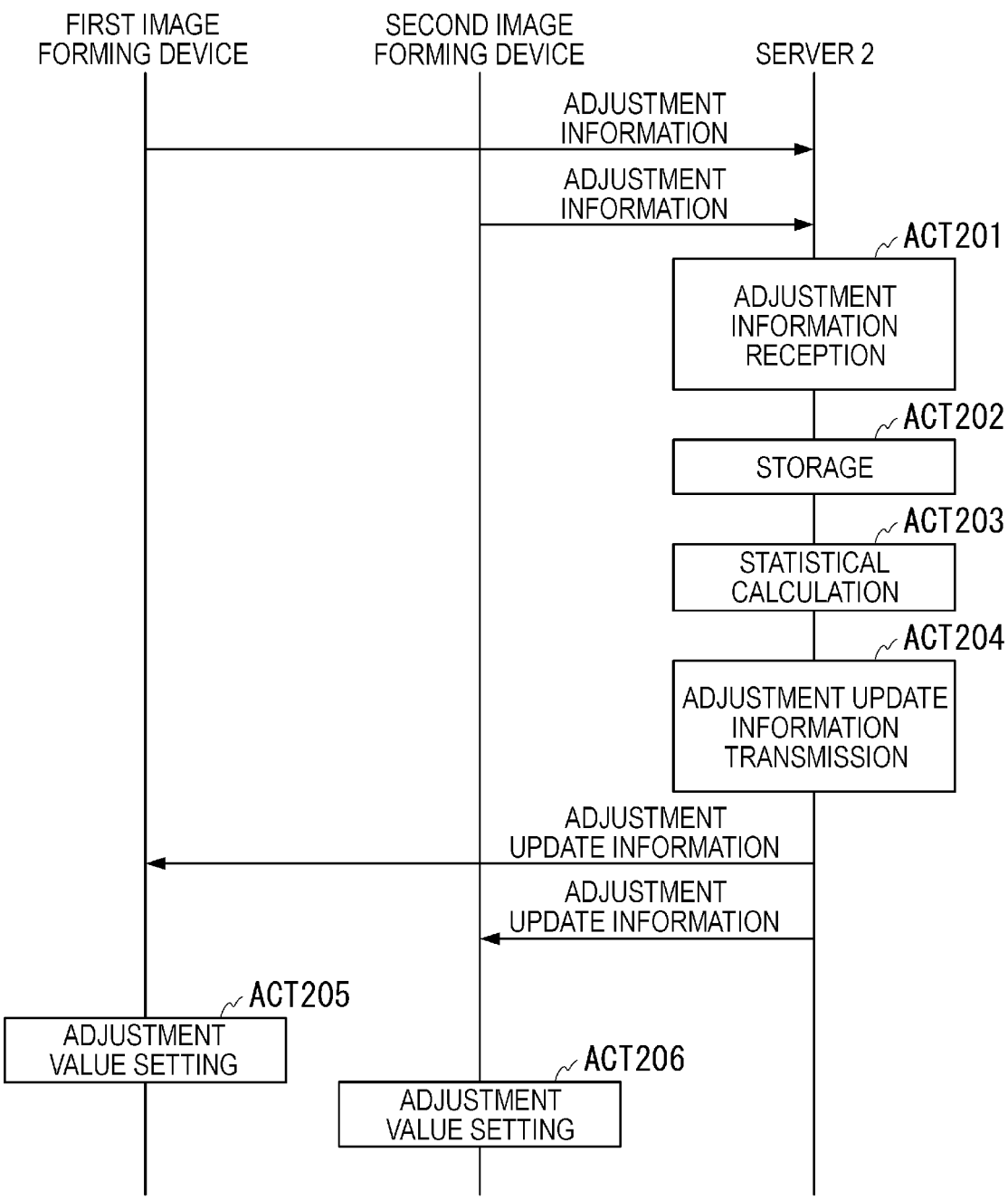
FIG. 13 is a sequence diagram illustrating an example of a flow of an adjustment process of the image forming system 100.

FIG. 13 is a sequence diagram illustrating an example of the flow of the adjustment process of the image forming system 100. In the description of FIG. 13, an image forming device 1 among the plurality of image forming devices 1 is referred to as a first image forming device, and another one of the image forming devices 1 among the plurality of image forming devices 1 is referred to as a second image forming device. in the description of FIG. 13, processes performed between the two image forming devices 1 of the first image forming device and the second image forming device and the server 2 are exemplified to describe processes performed between the plurality of image forming devices 1 and the server 2.

The communication unit 22 of the server 2 receives the adjustment information transmitted from each of the first image forming device and the second image forming device (ACT 201). The first image forming device and the second image forming device may transmit the adjustment information to the server 2 at the timing when the adjustment value is adjusted or the timing determined in advance.

Subsequently, the control unit 21 of the server 2 stores the adjustment information received in ACT 201 in the auxiliary storage device 23 (ACT 202). Specifically, the control unit 21 reads the image forming device information table stored in the auxiliary storage device 23. The control unit 21 selects the record including the device identification information of the image forming device 1 that is a transmission source of the adjustment information among the records of the read image forming device information table. The control unit 21 stores the adjustment information by storing the obtained adjustment information in the item of the adjustment information of the select record.

Subsequently, the control unit 21 determines the adjustment value to be used by the first image forming device and the second image forming device by statistical calculation by using the stored adjustment information (ACT 203). The control unit 21 performs the process of determining the adjustment value at a predetermined timing (for example, once a week or once a month). Specifically, the control unit 21 generates a table obtained by associating the device identification information, the environment value information, and the first adjustment value information that are stored in the image forming device information table. This process may be performed for each combination of the printing modes of all of the image forming devices 1, the types of the print media, and at least one of the front surface of the print medium and the back surface of the print medium. This process may be configured to be performed for each combination of the printing mode of the image forming devices 1 included in the same group described above, the types of the print media, and at least one of the front surface of the print medium and the back surface of the print medium. As an example, a case where this process is performed for each combination of the printing mode of the image forming devices 1 included in the same group described above, the types of the print media, and at least one of the front surface of the print medium and the back surface of the print medium is described.

Whether the image forming devices are in the same group is determined based on the installation locations of the image forming devices 1, the device identification information of the image forming devices 1, any group by the user, and the like. In the present process, an example in which the same group is determined based on the installation location is described. For example, if the installation locations of the image forming devices 1 are in the predetermined area (the same building, the same district, or the like), the control unit 21 determines that the image forming devices 1 at the position in the predetermined area are in the same group. As an example, a case where the first image forming device and the second image forming device are in the same group is described.

Subsequently, the control unit 21 counts the number of the image forming devices 1 that are in the same group and have the same combination of the printing mode, the type of the print medium, and at least one of the front surface of the print medium and the back surface of the print medium, for each of the same adjustment value, by using the generated table. For example, the control unit 21 counts the total number of the image forming devices 1 of which the adjustment value is "7", . . . , and the total number of the image forming devices 1 of which the adjustment value is "1". Also, the control unit 21 calculates an average value of the entire adjustment values used by the image forming devices 1 that are in the same group and have the same combination of the printing mode, the type of the print medium, and at least one of the front surface of the print medium and the back surface of the print medium, by Expression (1) below, by using the counted total number of the image forming devices 1. In addition, if the calculation result is a decimal number, the control unit 21 converts the calculation result into an integer by, for example, rounding.

$$\text{The entire average value} = \{7 \times (\text{the total number of the image forming devices of which the adjustment value is "7"}) + 6 \times (\text{the total number of the image forming devices of which the adjustment value is "6"}) + \ldots + 1 \times (\text{the total number of the image forming devices of which the adjustment value is "1"})\} \div \text{the total number of the image forming devices that are in the same group and have the same combination of a printing mode, a type of paper, and the front surface and the back surface} \quad (1)$$

Also, the control unit 21 determines the calculated entire average value as the adjustment value to be used in the group. In this case, in all of the humidity (for example, 0% to 100%), the same adjustment value is used. Instead of the average value, the control unit 71 may be configured to determine the other statistical value as the adjustment value to be used in the group. The control unit 21 generates the adjustment update information including the second adjustment value information indicating the determined adjustment value. The control unit 21 controls the communication unit 22 and transmits the generated adjustment update information to the first image forming device and the second image forming device (ACT 204). In ACT 204, the control unit 21 further updates the applied voltage adjustment value table. The control unit 21 stores the adjustment value determined in the corresponding statistical calculation in the applied voltage adjustment value table, as the adjustment value corresponding to the resistance value of the print medium corresponding to the group used for determining the adjustment value determined in such statistical calculation and the humidity corresponding to the group. The applied voltage adjustment value table is a table used if the server 2 transmits the adjustment update information to the image forming devices 1 as a response to the adjustment information in a case where the adjustment information is transmitted to the server 2, for example, at the time set in advance. In this case, even if the statistical calculation is newly performed, the adjustment update information transmitted to the image forming devices 1 as a response may not be changed. In such a case, the server 2 can transmit the adjustment update information to the image forming devices 1 as a response to the adjustment information, without performing the statistical calculation, by referring to the applied voltage adjustment value table. The applied voltage adjustment value table may be configured to be used for the other purposes by the server 2.

Subsequently, the network interface 130 of the first image forming device receives the adjustment update information transmitted from the server 2. The control unit 71 of the first image forming device sets the adjustment value indicated by the second adjustment value information included in the received adjustment update information in the first image forming device (ACT 205).

The network interface 130 of the second image forming device receives the adjustment update information transmitted from the server 2. The control unit 71 of the second image forming device sets the adjustment value indicated by the second adjustment value information included in the received adjustment update information in the first image forming device (ACT 206).

With the image forming system 100 configured as above, the server 2 collects the adjustment information from the plurality of image forming devices 1. The server 2 statistically determines the adjustment values to be respectively used in the plurality of image forming devices 1 by using the collected adjustment information. Also, the server 2 transmits the adjustment update information including the determined adjustment values to the plurality of image forming devices 1, respectively. The plurality of image forming devices 1 update the adjustment values by using the adjustment update information transmitted from the server 2. In other words, the plurality of image forming devices 1 set the adjustment values indicated by the second adjustment value information included in the adjustment update information transmitted from the server 2 in the image forming devices 1. Also, the plurality of image forming devices 1 perform printing based on the applied voltages according to the newly set adjustment values. Accordingly, the image forming system 100 can provide stable image qualities by eliminating the transfer failure caused by the variation of the resistance values of the print medium for each type of the print medium.

In Expression (1) above, the adjustment values is the same regardless of the humidity. Therefore, a case of being influenced by the humidity is assumed. Therefore, the control unit 21 of the server 2 may be configured to determine the adjustment value for each value of the humidity. In such configuration, the control unit 21 counts the number of the image forming devices 1 that are in the same group and have the same combination of the printing mode, the type of the print medium, and at least one of the front surface of the print medium and the back surface of the print medium by using the generated table for each adjustment value of humidity categories. For example, the control unit 21 counts the total number of the image forming devices 1 of which humidity is "0% to 10%" for each adjustment value, . . . , and the total number of the image forming devices 1 of which the humidity is "90% to 100%" for each adjustment value. Accordingly, for example, the control unit 21 can obtain the number of the image forming devices 1 for each adjustment value in each humidity category. Also, the control unit 21 determines the adjustment value if the number of the image forming devices 1 is the maximum for each humidity category. The control unit 21 determines the determined adjustment value as the adjustment value to be used for each humidity category in the group. Accordingly, the server 2 can determine the different adjustment values for each humidity category.

Another example in a case where the adjustment value is determined for each value of the humidity is described.

The control unit 21 may calculate the average value of the adjustment value for each humidity category by applying Expression (1) above to each humidity category. In this case, in Expression (1), the total number of the image forming devices 1 that are in the same group and have the same combination of the printing mode, the type of the print medium, and at least one of the front surface of the print medium and the back surface of the print medium becomes the total number of the image forming devices 1 in each humidity category.

As above, the image forming system according to the embodiment (in the example described above, the image forming system 100) includes a plurality of image forming devices (in the example described above, the plurality of image forming devices 1) and a server (in the example described above, the server 2). The plurality of image forming devices each include a receiving unit (in the example described above, the control panel 20), a detection unit (in the example described above, the detection unit DC), a first communication unit (in the example described above, the network interface 130), and a first control unit (in the example described above, the control unit 71). The receiving unit receives an adjustment value for adjusting a value of an applied voltage in case of transfer in response to an operation of a user. The detection unit detects a value of an electric resistance of a print medium as a resistance value. The first communication unit transmits adjustment information including first adjustment value information indicating the adjustment value received by the receiving unit and information indicating the resistance value detected by the detection unit to the server and receives the adjustment update information including second adjustment value information indicating the adjustment value determined based on the adjustment information from the server. The first control unit controls the applied voltage based on adjustment value indicated by the second adjustment value information included in the adjustment update information received by the first communication unit. The server includes a second control unit and a second communication unit. The second control unit determines adjustment values respectively used in the plurality of image forming devices by using adjustment information transmitted from the plurality of image forming devices, respectively. The second communication unit transmits the adjustment update information including the second adjustment value information indicating the determined adjustment value to the plurality of image forming devices, respectively. Accordingly, the image forming system can suppress a variation in a quality of transfer of the toner image to the print medium in response to a type of the print medium.

In the image forming system, a configuration in which the plurality of image forming devices each include a first transfer body to which the toner image is primarily transferred (in the example described above, the transfer belt 31), a second transfer roller that transfers the toner image transferred to the first transfer body to the print medium (in the example described above, the secondary transfer roller 352), and an opposing roller that faces the second transfer roller (in the example described above, the opposing roller 351), the opposing roller is grounded, and the detection unit detects a value of an electric current that flows from the second transfer roller to the opposing roller by a voltage applied to the second transfer roller and detects the resistance value based on the detected value of the electric current may be used.

In the image forming system, a configuration in which the detection unit detects the resistance value based on the value of the electric current detected by the detection unit in a case where the print medium does not pass between the second transfer roller and the opposing roller, and the value of the electric current detected by the detection unit in a case where the print medium passes between the second transfer roller and the opposing roller may be used.

In the image forming system, a configuration in which the receiving unit receives an input of the adjustment value via an adjustment screen that receives the input of the adjustment value (in the example described above, the adjustment screen ST) may be used.

In the image forming system, a configuration in which the receiving unit receives at least one of the adjustment value with respect to the printing on the front surface of the print medium and the adjustment value with respect to the printing on the back surface of the print medium via the adjustment screen may be used.

In the image forming system, a configuration in which the receiving unit receives any one or the both of print medium type information indicating the type of the print medium and printing mode information indicating a printing mode via the adjustment screen may be used.

In the image forming system, a configuration in which the plurality of image forming devices each include a storage unit that stores setting adjustment value information indicating the set adjustment value (in the example described above, the auxiliary storage device 120), and the first control unit updates the adjustment value indicated by the setting adjustment value information stored in the storage unit based on the adjustment update information received from the server may be used.

In the image forming system, a configuration in which the server includes a storage unit that stores an image forming device information table obtained by collecting the adjustment information received respectively from the plurality of image forming devices in one table (in the example described above, the auxiliary storage device 23) may be used.

In the image forming system, a configuration in which the plurality of image forming devices each further include a second detection unit that detects a value of humidity (in the example described above, the environment value detection unit ED), and first adjustment value information, information indicating a resistance value, and the information indicating the value of the humidity detected by the second detection unit are included in the adjustment information may be used.

In the image forming system, a configuration in which the second control unit determines adjustment values to be used in the plurality of image forming devices, respectively, for each combination of the resistance value and the humidity, by using the adjustment information transmitted from the plurality of image forming devices, respectively, may be used.

A portion of the functions of the image forming devices 1 according to the above embodiment may be embodied by a computer. In this case, a program for embodying this function is recorded in a computer-readable recording medium. Also, the embodiment may be embodied by causing the computer system to read the program recorded in a recording medium in which the program is recorded. The "computer system" described herein includes an operating system and hardware such as peripheral devices. In addition, the "computer-readable recording medium" refers to a portable medium, a storage device, or the like. The portable medium is a flexible disk, a magneto-optical disk, a ROM, a CD-ROM, or the like. The storage device is a hard disk or the like built in the computer system. Further, the "computer-readable recording medium" is a medium that dynamically stores a program for a short period of time, such as a communication line if a program is transmitted via a communication line. The communication line is a network such as the Internet, a telephone line, or the like. Further, the "computer-readable recording medium" may be a volatile memory inside a computer system functioning as a server or a client. The volatile memory stores a program for a certain period of time. Further, the above program may be a program for embodying a portion of the functions described above. Further, the above program may be a program that further embodies the functions described above in combination with a program already recorded in the computer system.

While certain embodiments have been described, these embodiments have been presented by way of example only, and are not intended to limit the scope of the inventions. Indeed, the novel embodiments described herein may be embodied in a variety of other forms: furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming system, comprising:
a plurality of image forming devices; and
a server,
wherein the plurality of image forming devices each comprise:
a receiving component configured to receive an adjustment value for adjusting a value of an applied voltage in case of transfer in response to an operation of a user,
a detector configured to detect a value of an electric resistance of a print medium as a resistance value;
a first communication component configured to transmit adjustment information including first adjustment value information indicating the adjustment value received by the receiving component and information indicating the resistance value detected by the detector to the server and receive adjustment update information including second adjustment value information indicating the adjustment value determined based on the adjustment information from the server, and
a first controller configured to control the applied voltage based on the adjustment value indicated by the second adjustment value information included in the adjustment update information received by the first communication component, and
the server comprises:
a second controller configured to use the adjustment information transmitted respectively from the plurality of image forming devices and determine the adjustment values to be used in the plurality of image forming devices, and
a second communication component configured to transmit the adjustment update information including the second adjustment value information indicating the determined adjustment values respectively to the plurality of image forming devices.

2. The image forming system according to claim 1,
wherein the plurality of image forming devices each further comprise:
a first transfer body to which a toner image is primarily transferred,
a second transfer roller configured to transfer the toner image from the first transfer body to the print medium, and
an opposing roller configured to face a second transfer roller,
the opposing roller is grounded, and
the detector detects a value of an electric current that flows from the second transfer roller to the opposing roller by a voltage applied to the second transfer roller and detects the resistance value based on the detected value of the electric current.

3. The image forming system according to claim 2,
wherein the detector detects the resistance value based on the value of the electric current detected by the detector if the print medium does not pass between the second transfer roller and the opposing roller, and the value of the electric current detected by the detector if the print medium passes between the second transfer roller and the opposing roller.

4. The image forming system according to claim 1, wherein the receiving component receives an input of the adjustment value via an adjustment screen that receives the input of the adjustment value.

5. The image forming system according to claim 4, wherein the receiving component receives at least one of the adjustment value with respect to printing on a front surface of the print medium and the adjustment value with respect to printing on a back surface of the print medium via the adjustment screen.

6. The image forming system according to claim 4, wherein the receiving component receives any one or both of print medium type information indicating a type of the print medium and printing mode information indicating a printing mode via the adjustment screen.

7. The image forming system according to claim 1, wherein the plurality of image forming devices each further comprise a storage component configured to store setting adjustment value information indicating the adjustment value that is set, and the first controller updates the adjustment value indicating the setting adjustment value information stored in the storage component based on the adjustment update information received from the server.

8. The image forming system according to claim 1, wherein the server further comprises a storage component configured to store an image forming device information table obtained by collecting the adjustment information received from the plurality of image forming devices, respectively.

9. The image forming system according to claim 1, wherein the plurality of image forming devices further comprise a second detector that detects a value of humidity, and the first adjustment value information, the information indicating the resistance value, and the information indicating the value of the humidity detected by the second detector are included in the adjustment information.

10. The image forming system according to claim 1, wherein the second controller uses the adjustment information transmitted respectively from the plurality of image forming devices and determines the adjustment values to be used in the plurality of image forming devices for each combination of the resistance value and humidity.

11. A method for an image forming system, comprising:
receiving an adjustment value for adjusting a value of an applied voltage in case of transfer in response to an operation of a user;
detecting a value of an electric resistance of a print medium as a resistance value;
transmitting from a plurality of image forming devices adjustment information including first adjustment value information indicating the adjustment value received and information indicating the resistance value detected to a server and receiving by the plurality of image forming devices adjustment update information including second adjustment value information indicating the adjustment value determined based on the adjustment information from the server;

controlling the applied voltage based on the adjustment value indicated by the second adjustment value information included in the adjustment update information received;
using the adjustment information transmitted respectively from the plurality of image forming devices and determining the adjustment values to be used in the plurality of image forming devices; and
transmitting from the server the adjustment update information including the second adjustment value information indicating the determined adjustment values respectively to the plurality of image forming devices.

12. The method according to claim 11, further comprising:
transferring from the plurality of image forming devices the toner image from the first transfer body to the print medium; and
detecting a value of an electric current that flows from a second transfer roller facing an opposing roller to the opposing roller by a voltage applied to the second transfer roller and detecting the resistance value based on the detected value of the electric current.

13. The method according to claim 12, further comprising:
detecting the resistance value based on the value of the electric current detected if the print medium does not pass between the second transfer roller and the opposing roller, and the value of the electric current detected if the print medium passes between the second transfer roller and the opposing roller.

14. The method according to claim 11, further comprising:
receiving an input of the adjustment value via an adjustment screen that receives the input of the adjustment value.

15. The method according to claim 14, further comprising:
receiving at least one of the adjustment value with respect to printing on a front surface of the print medium and the adjustment value with respect to printing on a back surface of the print medium via the adjustment screen.

16. The method according to claim 14, further comprising:
receiving any one or both of print medium type information indicating a type of the print medium and printing mode information indicating a printing mode via the adjustment screen.

17. The method according to claim 11, further comprising:
storing setting adjustment value information indicating the adjustment value that is set in the plurality of image forming devices; and
updating the adjustment value indicating the setting adjustment value information stored based on the adjustment update information received from the server.

18. The method according to claim 11, further comprising:
storing in the server an image forming device information table obtained by collecting the adjustment information received from the plurality of image forming devices, respectively.

19. The method according to claim 11, further comprising:
detecting a value of humidity; and
including the first adjustment value information, the information indicating the resistance value, and the information indicating the value of the humidity detected in the adjustment information.

20. The method according to claim 11, further comprising:
using the adjustment information transmitted respectively from the plurality of image forming devices and determining the adjustment values to be used in the plurality of image forming devices for each combination of the resistance value and humidity.

* * * * *